United States Patent [19]

Sokoloski

[11] 4,034,951
[45] July 12, 1977

[54] GATE FOR INJECTION MOLD DIE CHANNEL

[76] Inventor: Edward B. A. Sokoloski, 404 W. Verona Ave., Verona, Wis. 53593

[21] Appl. No.: 730,281

[22] Filed: Oct. 6, 1976

[51] Int. Cl.² ............... B29C 1/00; B29F 1/05
[52] U.S. Cl. .................. 249/102; 425/186; 425/562
[58] Field of Search ............... 249/102, 141, 119; 425/245 R, 247, 242 R, 185, 186, DIG. 229

[56] References Cited

U.S. PATENT DOCUMENTS 3,799,494  3/1974  McLean, Jr. ............... 249/141 X

FOREIGN PATENT DOCUMENTS 2,114,465  10/1972  Germany ............... 425/247
2,306,366  9/1974  Germany ............... 425/247

Primary Examiner—Francis S. Husar
Assistant Examiner—William R. Briggs

[57] ABSTRACT

A quick-change, self-storing, interchangable plug-and-flow-gate set for use with multi-cavity injection mold dies is described, enabling individual die channels to be expeditiously gated and die cavities to be filled independently one of another.

2 Claims, 10 Drawing Figures

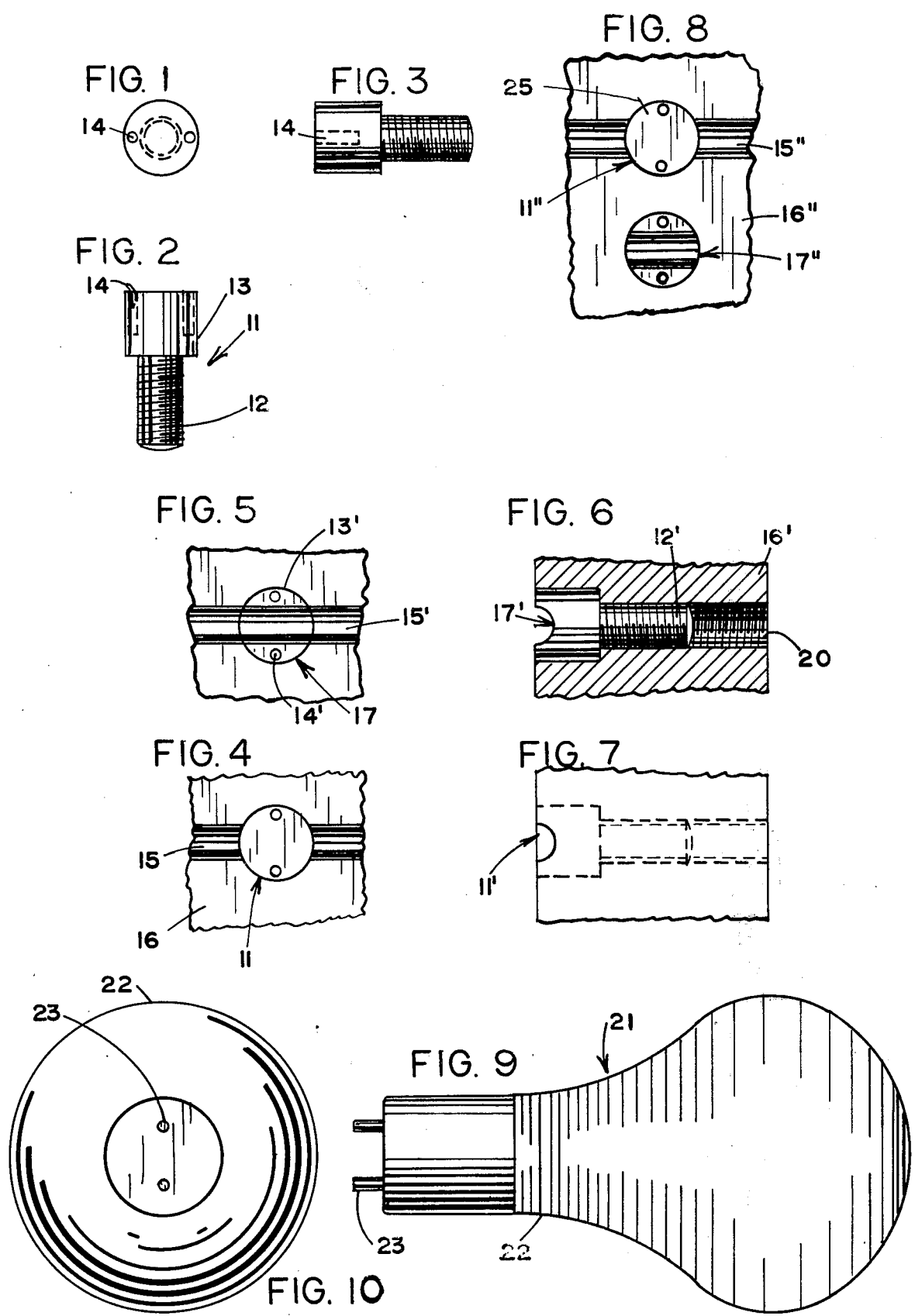

GATE FOR INJECTION MOLD DIE CHANNEL

BACKGROUND OF THE INVENTION

Injection mold dies for synthetic resins may comprise multiple cavities, each having an associated channel feeding resin to the cavity from a central manifold. When it is desired to use only selected cavities, it is necessary to block access channels to those cavities which are not to be used. One known method for blocking such channels is to mill a slot transversely of a die channel, drill and tap the die at the bottom of the slot on either side of the channel, and fit the slot with a rectilinear bar secured to the die by screw fasteners positioned in the drilled and tapped holes. To open the channel for subsequent use, the bar must be replaced with a similar member in which a channel opening has been cut. Such gates are relatively time-consuming and expensive to install, and occupy a relatively great amount of space in the mold.

SUMMARY OF THE INVENTION

The die channel plug and gate set of this invention consists of a pair of interchangeable headed screws, one member of the pair being blank headed except for two shallow holes drilled to receive a two-pronged screwdriver tool, and the other member being similarly drilled and fitted with a recessed channel of the same dimension as the die flow channel disposed transversely intermediate the drill holes. The upper and lower die members are each drilled, tapped and countersunk to receive the headed screws in a die channel site, the diameter of the screw heads being greater than the width of the die channel for complete interception of flow in the channel.

In a location adjacent to the die channel, a similar hole is drilled, tapped and countersunk as a storage location for the unused member, plug or gate as the case may be, which is not situated in the channel site. Location of the storage site adjacent to the channel site reduces the chance that a matched set of plug and gate members may become mingled with other similar parts, and the use of screw type plug and gate configurations minimizes the space requirements for gating of channels at crowded locations in a die.

DESCRIPTION

FIG. 1 is a plan view of a plug member of this invention;

FIG. 2 is a front elevation of the plug member of FIG. 1;

FIG. 3 is a side elevation of the plug member of FIGS. 1 and 2;

FIG. 4 is a plan view of plug member of FIGS. 1, 2 and 3 of this invention received in a die member;

FIG. 5 is a plan view of a gate member of this invention operably received in a die member;

FIG. 6 is a partial cross-sectional elevation of the gate member and die member of FIG. 5;

FIG. 7 is an elevation of a die member with the gate member of FIGS. 5 and 6 received therein;

FIG. 8 is a plan view of a plug member and a gate member of this invention situated, respectively, in a channel location and in a storage location in a die member;

FIG. 9 is an elevation of a tool used for inserting and removing the plug and gate members of this invention;

FIG. 10 is a bottom view of the tool of FIG. 9.

In FIGS. 1 – 4, plug member 11 is shown comprising threaded stem 12 and head 13 with two diametrically spaced shallow holes disposed therein near the periphery, the spacing of holes 14 being greater than the width of channel 15 as shown in FIG. 4, and aligned perpendicularly thereto.

In FIGS. 5 – 7 gate member 17' is shown comprising threaded stem 12', head 13' and holes 14' in the manner of plug member 11 and in addition comprises channel 15' extending diametrically across the upper extremity of head 13' transversely intermediate of holes 14'. As shown, channel 15' conforms in configuration to channel 15 of die 16, however, the configuration of the two channels may differ, but preferably the cross sectional area of the configurations should be approximately equal to provide for uniform flow velocity through the channels.

Threaded hole 20 in die 16' is tapped for operably receiving threaded stems 12 and 12' of plug member 11 and gate member 17, respectively, to a depth sufficient to place the top surfaces of the members flush with top of the die, and with the shoulders of the countersinking firm against the bottom annular surface of heads 13, 13'. This is best achieved by firmly seating the threaded members and milling and stoning the upper surfaces into flush conformity with the die surfaces, and also in the case of gate member 17, of cutting channel 15' therein in precise alignment with channel 15 of die 16'. Plug and gate members, when so fitted in a particular location should not be used interchangeably in other locations. The procedure is followed both with the upper and the lower die blocks with the result that facing die surfaces and the upper facing surfaces of plugs 11 and of gates 17 are precisely leveled and are in contacting adjacency, thus constituting matched sets.

In FIG. 8, die 16" is shown with plug member 11" disposed to block channel 15" and with gate member 17" disposed in a storage site adjacent channel 15". The provision of a storage site in the proximity of the channel site insures proper selection of matched plug and gate pairs for each channel site. A storage site may be provided anywhere else as desired in a die, but it is preferred to locate it near adjacency to the channel site in insure proper identification of matched members.

In FIGS. 9 and 10, screwdriver-like tool 21 is shown comprising knob handle 22 and a pair of pins 23 projecting from the base of the tool. Pins 23 are spaced for being received in either holes 14 of plug member 11 or in holes 14' of gate member 17, serving to couple the tool to the member for rotatably inserting or removing the members from holes 20.

In operation, an injection mold die comprising locator pins positioning split and separable upper and lower die block halves, while assembled, is drilled and tapped at selected locations which intersect flow channels, thus precisely aligning the holes in the two halves when the die is assembled. The die halves are then separated and each hole is individually countersunk to a depth perferably about 0.020 – 0.025 inch shallower than the blank head thickness of plug member 11 or gate member 17. Plug and gate members are then separately and successively screwed into the tapped holes by means of tool 21 coupled in holes 14 or 14' which have been pre-drilled in the members, and the members, are leveled to the top surface of the die halves by milling and stoning operations. In addition, the gate members are milled with the configuration of the channel, preferably while secured against vibration and rotation by an abutting screw being run into the tapped hole from the opposite face of the die against the bottom of the member disposed within hole 20. Similar holes are drilled and tapped as storage sites in convenient adjacency and are countersunk somewhat more deeply to enable the upper surface of plug 11 or gate 17 to be recessed below the top of die 16 when in the storage site to prevent an interference fit with the facing die half. The storage sites in the die halves need not be aligned as in the case of the channel sites. With all plug and gate members in place in the die halves, the die may be assembled and used.

To insure that the plug and gate members are properly in register in hole 20, it is preferred to impress a mark 25 as shown in FIG. 8 with respect to plug member 11" in the head of the plug member and in the facing surface of the die as a reference mark at the time that the members are initially leveled with the surface of the die. By aligning the two halves of the mark when a member is inserted in hole 20, proper registry of the surfaces of the member and the die is assured. Impressing mark 25 is more significant with respect to a plug member than with respect to a gate member because the latter can be properly positioned by aligning channels 15, 15' in the die and member, respectively.

I claim:

1. Injection mold die apparatus comprising in combination
    a. a die member configured with a planar surface and with at least one die cavity and at least on communicating flow channel intersecting said surface,
    b. at least one flow gate site opening disposed to intersect said flow channel extending across said flow channel, the axis of said opening being substantially perpendicular to said flow channel and wherein at least a portion of said opening is internally threaded,
    c. at least one flow gate member at least partially externally threaded and configured complementary to said flow gate site opening to be precisely received in said flow gate site opening with the upper surface thereof when fully inserted configured and disposed to be flush with the planar surface of said die member and having a channel with the surface configuration of said flow channel and in alignment with said flow channel,
    d. at least one flow plug member configured complementary to said flow gate site opening to be precisely received in said flow gate site opening with the upper surface thereof when fully inserted configured and disposed to be flush with the planar surface of said die member and having a totally planar surface to block said flow channel when disposed in said flow gate site opening, and at least one storage site disposed in said die member apart from said flow channel and configured with an opening having at least a portion internally threaded and complementary to said members in a manner similar to said flow gate opening to receive alternatively either said flow gate member or said flow plug member.

2. The apparatus of claim 1 wherein two of said die members comprise a complete split die, said die members being provided with complementary disposed die cavities and flow channels, and with axially aligned flow gate site openings.

* * * * *